Figure 1:
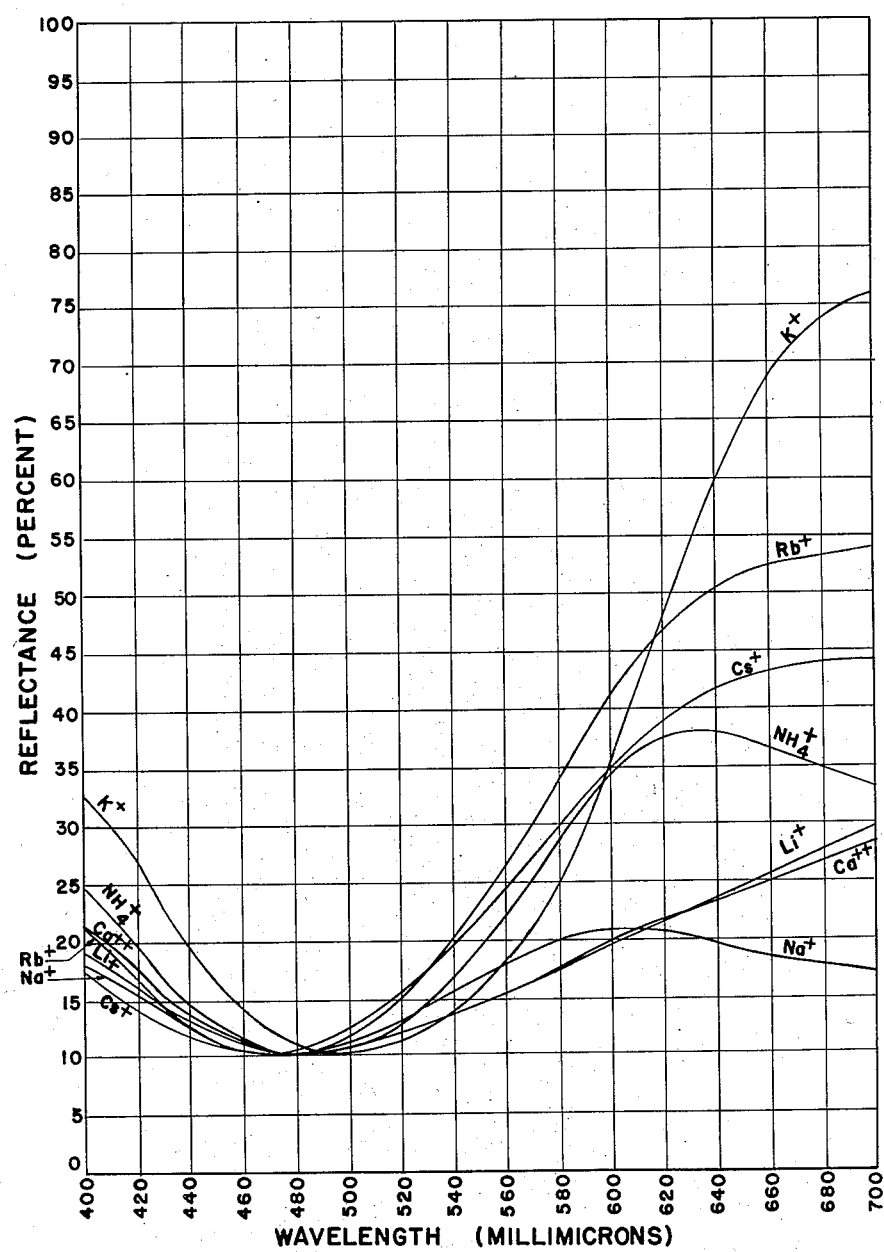
Figure 2:
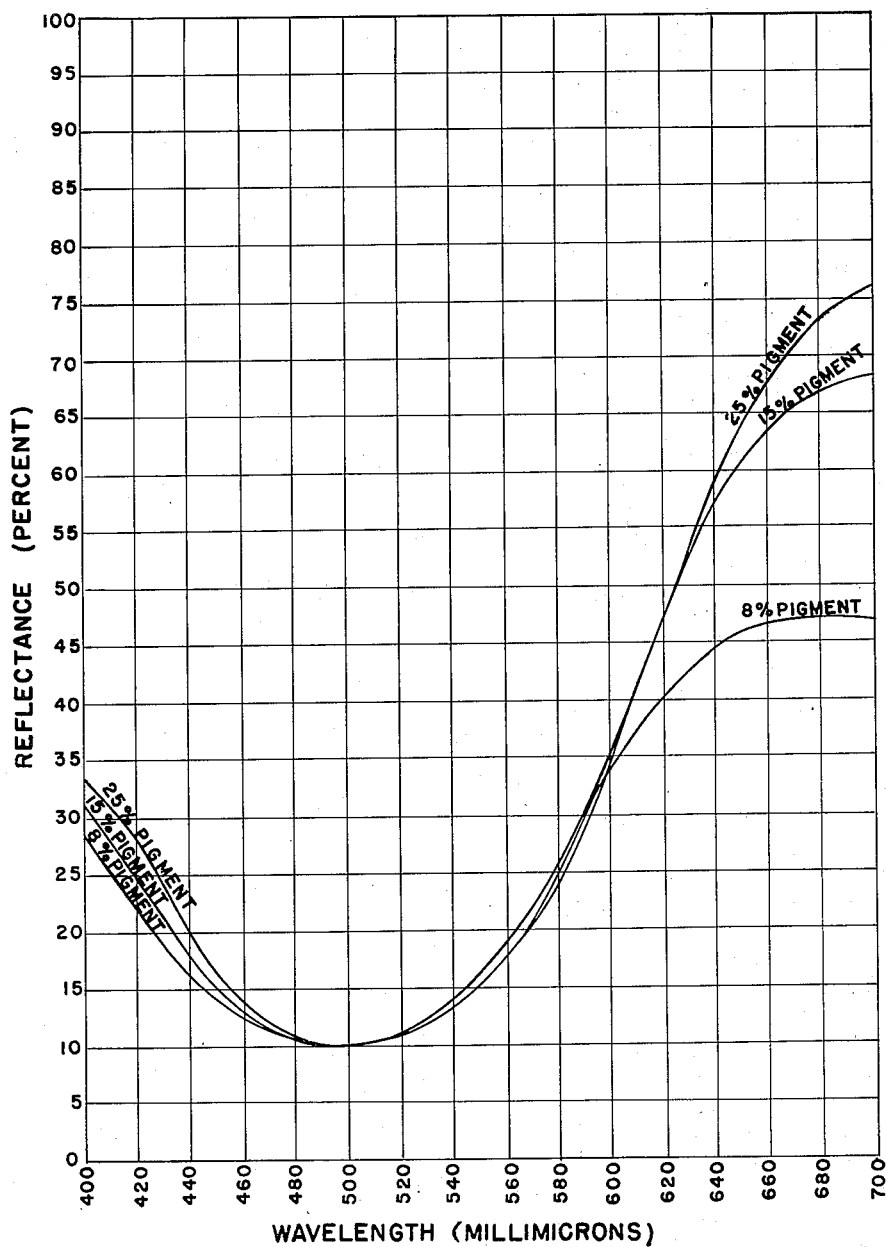

Patented Aug. 21, 1951

2,564,756

UNITED STATES PATENT OFFICE 2,564,756

INORGANIC MAROON

Albert E. Gessler, Scarsdale, N. Y., and Werner F. Goepfert, Short Hills, N. J., assignors to Interchemical Corporation, New York, N. Y., a corporation of Ohio Application February 21, 1946, Serial No. 649,292

3 Claims. (Cl. 23—77)

This invention relates to a deep maroon shade pigment which can be made by the reaction of copper sulfate and potassium ferrocyanide, and is designed particularly for the production of a pigment of such controlled particle size that optimum color purity is obtained.

It is known to react copper sulfate and potassium ferrocyanide to produce a dark-brown gelatinous copper ferrocyanide which is used in semi-permeable membranes for osmosis work. In reporting on this reaction, many investigators have described the production of mixtures of copper ferrocyanide with copper potassium ferrocyanide —$K_2CuFe(CN)_6$. This second product has been produced by various methods; it is generally described in the literature as a reddish-brown crystalline material.

We have discovered that a clean bright maroon pigment can be obtained by reacting copper sulfate and potassium ferrocyanide under certain definitely controlled conditions. The product is characterized by its bright maroon color, by its range of particle size and by a potassium content which roughly ($\pm 2.0\%$) approximates theoretical (22.1%) for $K_2CuFe(CN)_6$.

The spectral characteristics of the pigment can be best explained by reference to the accompanying figures which present a number of spectrophotometric curves of various pigments made from copper sulfate and soluble ferrocyanides. In these figures, percent reflectance is plotted against the wave length of light incident on the surface. All curves were made from very thin films of linseed oil dispersions applied on a white opaque highly polished surface (Carrara glass).

The pigment having most satisfactory spectral characteristics is the potassium product shown in the curve marked "K+" in Fig. I. It will be observed that it has a maximum reflectance above 70% at 700 millimicrons at the red end of the spectrum, and a reflectance of about 30% at 400 millimicrons at the violet end of the spectrum when the reflectance is 10% at the wave length of maximum absorption.

It will be noted that potassium appears to be unique in producing good color. The curves marked "NH4+," "Na+," "Rb+," "Cs+," "Li+" and "Ca++" are indicative of results obtained with other alkali metals under conditions similar to those used for potassium.

The color is the result of both chemical composition and particle size. It is essential to react concentrated solutions of the reactants. Both the copper sulfate and potassium ferrocyanide solutions should be of at least 20% concentration (based on the commercial hydrates $CuSO_4.5H_2O$ and $K_4Fe(CN)_6.3H_2O$). Below this point, the pigments are too brown. Above this point, color value improves slightly to optimum at about 25% concentration; higher concentrations produce no change. However, because of the limited solubility of the reactants, we prefer to avoid concentrations substantially in excess of 30%.

In Fig. II, the curve marked, "8% pigment" is for a dark-brown product made by reacting copper sulfate and potassium ferrocyanide under conditions essentially like those yielding the results of this invention, but at 8% (hydrated salts) reactant concentrations, instead of the necessary 20% or more; the 15% curve is for a reddish-brown pigment similarly produced at 15% reactant concentrations. The potassium content of the 8% pigment is about 15%; it contains particles up to about 0.5 or 0.6 micron diameter, but with many fine particles below 0.03 micron, and many below 0.01 micron.

The potassium content of the 15% pigment is about 20%, which is fairly close to the theoretical for $K_2CuFe(CN)_6$. However, the product still contains a substantial number of small particles below 0.01 micron, and a large number under 0.03, with some particles up to about 0.5 micron in diameter.

The desirable pigment has a potassium content approximating theoretical for $K_2CuFe(CN)_6$, but not far from that of the 15% pigment. However, the particle size distribution is characterized by the substantial absence of particles below about 0.03 micron; the range is from about 0.03 to 0.5 micron, with a mean diameter of 0.2 to 0.3.

The second important consideration in the reaction is that the ferrocyanide always be in excess if a brown pigment is to be avoided. Because of this requirement, a simultaneous precipitation with excess of ferrocyanide, or addition of the sulfate to the ferrocyanide, are preferred procedures. For the same reason, adequate stirring is necessary in adding copper sulfate to ferrocyanide, to prevent local excess of copper.

The third consideration is temperature. The reaction should be carried out at a minimum of 75° C., and preferably at or approaching the boiling temperature.

Examples I and II give laboratory and plant procedures for producing the K pigment of Fig. I.

Example I 100 grams of a 25% solution of copper sulfate ($CuSO_4.5H_2O$) at 75–85° C. and containing 0.3 cc.

of concentrated sulfuric acid are added dropwise over a period of 30 minutes to 184 grams of a 25% solution of potassium ferrocyanide which is being continuously stirred and heated to the boiling temperature. In the laboratory it is best to carry this reaction out in a three-neck flask equipped with a high-speed stirrer, reflux condenser and a dropping funnel. After addition of the copper sulfate solution the mixture is stirred without heating for another 30 minutes. It is then filtered on a Buchner funnel and washed with successive portions of hot water, totalling about 1 liter, in order to free the precipitate of potassium sulfate. When the precipitate is completely washed it is removed and dried in an oven at about 80° C., for 18 hours. The procedure yields 32 grams of pigment.

*Example II*

2000 pounds of a 25% solution of copper sulfate ($CuSO_4.5H_2O$) at 75–85° C. and containing 10 pounds of concentrated sulfuric acid are added slowly during a period of 38 minutes to 3680 pounds of a 25% solution of potassium ferrocyanide ($K_4Fe(CN)_6.3H_2O$) which is being continuously stirred and heated to 95–100° C. The reaction is carried out in a glass-lined jacketed kettle equipped with a condenser and stirrer. After addition of the copper sulfate solution the mixture is stirred for another 30 minutes. The precipitate is then filtered by gravity in a plate and frame filter press, washed with water for 12 hours and dried at about 80° C. for 18 hours. The procedure yields 630 pounds of pigment.

These examples can, of course, be multiplied, without departing from the scope of the invention.

Our new pigment, when used in making paints, lacquers and enamels for outside exposure, gives coatings having good resistance to weathering, being comparable in that respect to similar coatings made with the best-known organic maroons.

A particular advantage of our new pigment is its transparency which permits its being blended with the commonly used expensive organic maroons in high percentages without producing the muddy colors which are characteristic of blends produced with organic maroons and other inorganic colorants such as iron oxide, cadmium reds, etc.

We claim:

1. The method of producing a maroon pigment of approximately the constitution $$K_2CuFe(CN)_6$$

which comprises reacting, at a temperature between 75° C. and boiling, an aqueous solution containing 20 to 30% of $CuSO_4.5H_2O$ with an aqueous solution containing 20 to 30% of $K_4Fe(CN)_6.3H_2O$, while maintaining an excess of ferrocyanide in the reaction.

2. The method of producing a maroon pigment of approximately the constitution $$K_2CuFe(CN)_6$$

which comprises reacting, at a temperature between 75° C. and boiling, an aqueous solution containing 20 to 30% of $CuSO_4.5H_2O$ with an aqueous solution containing 20 to 30% of $$K_4Fe(CN)_6.3H_2O$$

while maintaining an excess of ferrocyanide in the reaction mixture, and separating the precipitated pigment by filtering.

3. The method of producing a maroon pigment of approximately the constitution $$K_2CuFe(CN)_6$$

which comprises slowly adding an aqueous solution containing 20–30% $CuSO_4.5H_2O$ to a rapidly stirred aqueous solution containing 20–30% of $K_4Fe(CN)_63H_2O$ heated to a temperature of 75° C. to boiling and separating the precipitated pigment by filtering.

ALBERT E. GESSLER.
WERNER F. GOEPFERT.

REFERENCES CITED

The following references are of record in the file of this patent:

Richardson et al.: Journal of the American Chemical Society, vol. 62 (1940), page 3182.